Nov. 15, 1960  H. L. POTTER  2,959,819
METHOD OF MAKING BEARING SEAL
Original Filed March 2, 1956
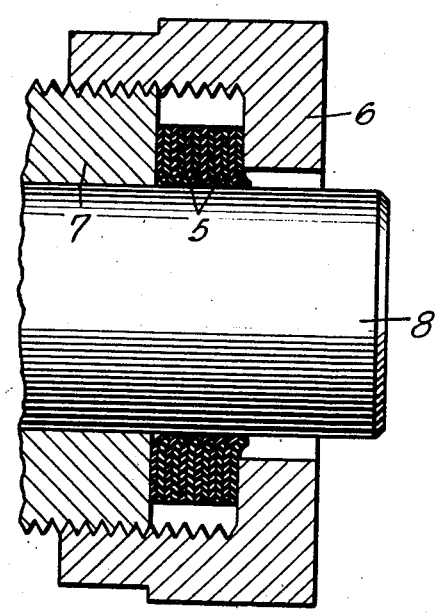
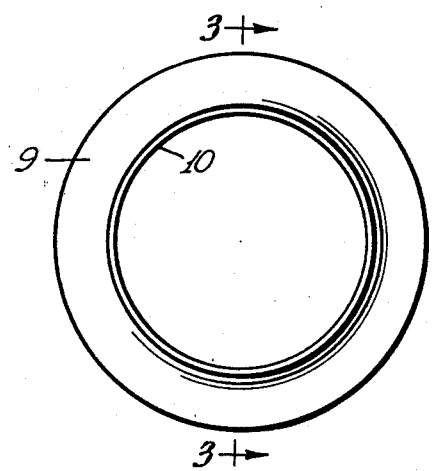
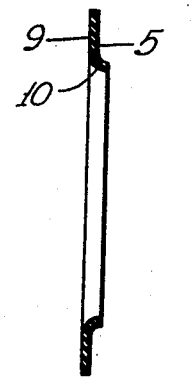
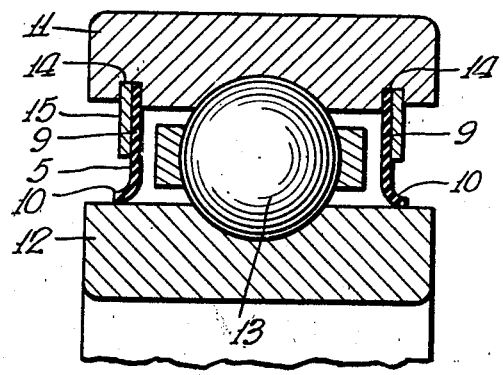
INVENTOR
*Howell L. Potter*
BY
*Mitchell Bechert*
ATTORNEYS United States Patent Office 2,959,819
Patented Nov. 15, 1960

2,959,819

METHOD OF MAKING BEARING SEAL

Howell L. Potter, New Britain, Conn., assignor to The Fafnir Bearing Company, New Britain, Conn., a corporation of Connecticut Original application Mar. 2, 1956, Ser. No. 569,017. Divided and this application Jan. 3, 1957, Ser. No. 632,394

1 Claim. (Cl. 18—56)

This invention relates to a method of making a bearing seal and this application is a division of my application Serial No. 569,017 filed March 2, 1956, and now abandoned.

A bearing seal is very often formed of a washer of rubber, or similar material, which is carried by one bearing ring and runs on the other. Such a bearing seal is most often carried by the outer ring and runs on the cylindrical outer surface of the inner. It is difficult to pierce the bores in the washers so that they fit perfectly on the cylindrical surface of the inner ring so as to act as a seal and yet to not fit so tightly that they bind. Sometimes the bores of the washers are made somewhat smaller initially than the outer cylindrical surface of the inner ring and the inner radial part of the washer is then distorted to some extent by passing it over the inner ring, thus increasing the diameter of the bore and at the same time causing the inner periphery adjacent the bore to be offset from the rest of the washer. Such a method provides a very tight seal, but in distorting the inner periphery of the washer and increasing the bore, the rubber-like material tends to grip the inner ring and make an exceedingly tight running seal.

It is an object of my invention to provide a method of making an improved bearing seal comprising a washer having a permanent offset adjacent one periphery of the washer, which offset is permanently formed in the washer so that it may fit the cylindrical surface of one of the rings and yet not bind thereon.

Another object is to provide an improved method of making a bearing seal to provide a permanent set in the seal and permit a proper running fit on an adjacent bearing surface.

Briefly stated, in a preferred form of the invention, I stack a plurality of washers of uncured rubber, or rubber-like material, and hold the outer portions thereof so as to keep them in shape, and then pass a mandrel through the registering bores in all of the washers so as to distort the inner peripheries thereof, and causes the portions adjacent the bores to be turned a very substantial angle to the bodies of the washers. The washers, while thus distorted and held, are cured in place so as to cause them to retain a permanent set, occasioned by the distortion provided by the holding means and the mandrel.

In the drawings which help to illustrate the invention and show, for illustrative purposes only, a preferred form of the invention, Fig. 1 is a central sectional view through a holder and mandrel showing a plurality of washers in place.

Fig. 2 is an axial view in elevation of a washer illustrative of the invention.

Fig. 3 is a sectional view, taken substantially in the plane of the line 3—3 of Fig. 2.

Fig. 4 is a fragmentary sectional view of a bearing showing my improved bearing seals in place at both sides of the bearing.

In forming the washers and carrying out the method, I preferably stack a plurality of washers 5 of uncured rubber or rubber-like material and hold the same in a holder which may consist of a nut 6 and a plug 7 between which the washers are securely held so as to maintain the washers in proper shape. A mandrel 8, slightly larger than the bores of the washers, is then passed through the bores of the washers so as to distort the same, as shown particularly in Fig. 1, and cause the inner peripheries to be bent at considerable of an angle, even perhaps to a right-angle. When the washers are thus distorted, the bores, of course, are increased and a substantial portion of each washer may rest on the outer surface of the mandrel 8. With the washers thus held, they are baked or cured or otherwise treated, so as to finish the same and cause them to maintain a permanent set, occasioned by distortion given to them by the holding means and the mandrel. Each washer then will have an outer portion 9 and an inner peripheral portion 10 extending at an angle to each other. This angle may be a substantial one, such as a right-angle, but in general the offset portion adjacent the bore may be considered as of generally frusto-conical shape.

These seal washers are designed to be carried by the outer ring 11 of an anti-friction bearing which includes also an inner ring 12 and interposed anti-friction bearing members 13. The outer ring may be circumferentially grooved, as indicated at 14, and one of my improved washers is inserted in the groove and may be held therein as by means of a snap-washer 15, or the like. The inner periphery offset portion 10 is of a diameter to just go over the inner bearing ring 12 with a nice running fit. Since the inner portion 10 is offset at a substantial angle to the body portion 9, there is considerable surface contact between the washer and the inner ring 12. Thus, there is good sealing action and no bind between the washer and the inner ring during rotation of the bearing. Since the washers have a permanent set, there is no substantial distortion of the washers when they are put on the bearing and yet the fit is a good running fit and much freer than when a prior art washer is distorted by forcing a cured washer up over the inner ring. If the structure should be such as to require the washer to be carried by the inner ring and ride on the outer ring, then the washer would be distorted at the outer periphery in much the same manner as heretofore described, that is, by gripping the washer and leaving the outer periphery free and passing a cylindrical mandrel over the washers and curing them while thus distorted. While the washers are shown and described as stacked, it is of course possible to form one or more seals at a time. Furthermore, it is possible to stack washers with plates or spacers between to secure sufficient bend at the free peripheries.

I have referred to the washers as being of "rubber," but by that term I mean any similar material which may be formed in an uncured state and then cured in a distorted state. The term "rubber" also covers rubber coated fabric which in most cases is superior to pure rubber in that it tends to hold its shape better in the presence of solvents, fuels, greases and water.

While the invention has been described in considerable detail and a preferred form illustrated and described, it is to be understood that changes may be made within the scope of the invention, as defined in the appended claim.

I claim:

The method of making bearing seals which comprises, stacking a plurality of washers of uncured rubber with the bores of the washers in general axial alignment, holding said stacked washers immediately adjacent the bores on one side of the stack and spaced back from the bores on the opposite side of the stack, passing a mandrel through the bores of the washers from the side which is held immediately adjacent the bores to expand the bores and distort the peripheries of the bores into generally frusto conical shape, guiding the mandrel while passing through the bores independently of the actual radial positions of the bores, and thereafter curing the rubber washers while being held distorted by said mandrel as aforesaid.

References Cited in the file of this patent

UNITED STATES PATENTS

| | | |
|---|---|---|
| 145,762 | Spooner | Dec. 23, 1873 |
| 1,454,506 | Christenson | May 8, 1923 |
| 1,528,659 | De Mattia | Mar. 3, 1925 |
| 2,015,445 | Bierer et al. | Sept. 24, 1935 |
| 2,270,185 | Dulmage | Jan. 13, 1942 |
| 2,424,567 | Hill | July 29, 1947 |

FOREIGN PATENTS

| | | |
|---|---|---|
| 61,442 | Germany | Mar. 11, 1892 |